PROCESS FOR COLOR CODING TFE INSULATED CABLES

Filed Sept. 1, 1970 4 Sheets-Sheet 1

ROBERT W. ANDERSON
AIME JOSEPH PERRAULT
*INVENTORS*

BY Sheldon I. Rakes
ATTORNEY

PROCESS FOR COLOR CODING TFE INSULATED CABLES

Filed Sept. 1, 1970 4 Sheets-Sheet 2

ROBERT W. ANDERSON
AIME JOSEPH PERRAULT
*INVENTORS*

BY Sheldon F. Rogers
ATTORNEY

March 13, 1973 R. W. ANDERSON ET AL 3,720,747

PROCESS FOR COLOR CODING TFE INSULATED CABLES

Filed Sept. 1, 1970 4 Sheets-Sheet 3

ROBERT W. ANDERSON
AIME JOSEPH PERRAULT
*INVENTORS*

BY Sheldon J. Rozes
ATTORNEY

March 13, 1973 R. W. ANDERSON ET AL 3,720,747

PROCESS FOR COLOR CODING TFE INSULATED CABLES

Filed Sept. 1, 1970 4 Sheets-Sheet 4

ROBERT W. ANDERSON
AIME JOSEPH PERRAULT
*INVENTORS*

BY Sheldon I. Raizes
ATTORNEY

United States Patent Office 3,720,747
Patented Mar. 13, 1973

3,720,747
PROCESS FOR COLOR CODING TFE INSULATED CABLES

Robert W. Anderson, Burlington, and Aime Joseph Perreault, South Burlington, Vt., assignors to Haveg Industries, Inc., Wilmington, Del.

Filed Sept. 1, 1970, Ser. No. 68,707
Int. Cl. B29c *9/00;* B29f *3/10, 3/12*
U.S. Cl. 264—246 7 Claims

ABSTRACT OF THE DISCLOSURE

A TFE extrusion preform is made up of a plurality of colored sections corresponding to the same number of wires which are to be insulated. The preform is arranged such that each colored section will cover a conductor wire upon extrusion. The resultant product is a multi-conductor cable with the insulation of each conductor integral with the insulation of the other conductor but of different colors for color coding (identification). Modifications of this idea are also disclosed whereby color coding is effected by different colored stripes rather than utilizing the various colors of insulation.

A cable is usually made up of a plurality of conductors each having a different color of insulation thereon. The purpose of the different colors is for identification which is referred to as color coding. Up until now, individual different colored polytetrafluoroethylene (hereinafter referred to as TFE) insulated conductors are twisted together to form a coaxial cable or are bonded to each other to form a flat ribbon cable.

It is an object of this invention to provide a process which will allow extrusion of multi-conductor TFE insulated cable where the cable is color coded upon extrusion.

Other objects will become apparent from the following description with reference to the drawings wherein.

Figure 1:
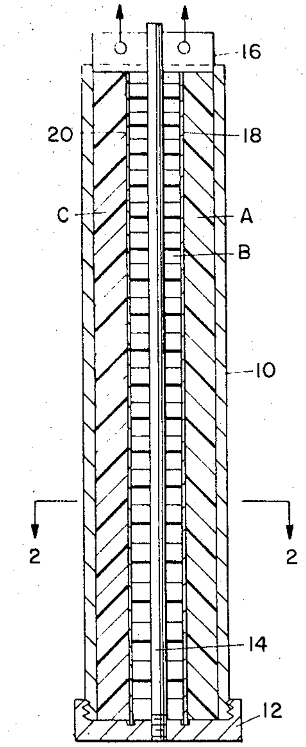
FIG. 1 is a view of a preform cylinder after it is initially filled with TFE powder.

Referring to FIG. 1, an elongated cylindrical metal preform container 10 is provided having a suitable removable bottom piece 12 and containing a metal rod 14 running from the bottom to the top. A partition member 16 is provided in the container, formed for example of sheet metal, and has walls 18 and 20 separating the space in the container into longitudinally extended cavities extending throughout the height of the container. Three or more subcavities may be provided, depending upon how many colors are desired for the insulation of the finished wire. Examples of the various color patterns will be more fully described hereinafter.

Figure 2:
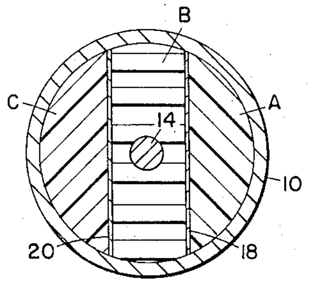
FIG. 2 is a view taken along section line 2—2 of FIG. 1.

Powdered TFE is first mixed in the usual way with a desired amount of lubricant such as naphtha, together with a desired amount of any well known colored material in the form of powdered mineral pigment. The pigments, lubricant, and powdered TFE may be uniformly mixed by tumbling the same together in a container. Thus such mixtures of desired colors may be poured into the various cavities formed in the metal container 10 such as colors A, B, and C as shown in FIG. 2. It should be understood that clear TFE is also considered a color.

Figure 3:
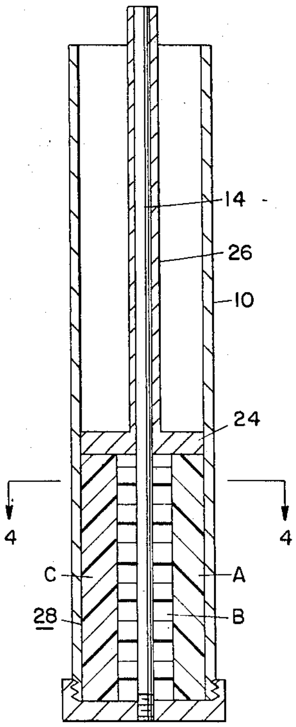
FIG. 3 is a view of the TFE powder being compacted.
Figure 4:
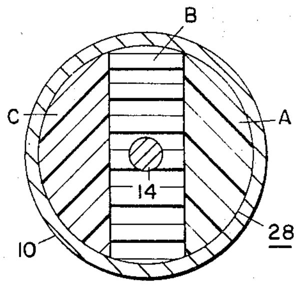
FIG. 4 is a view taken along section line 4—4 of FIG. 3.
Figure 5:
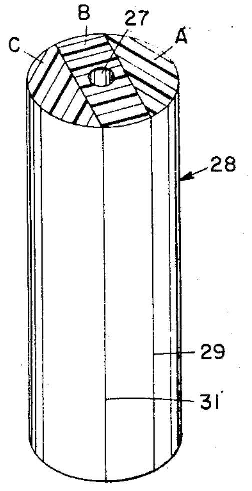
FIG. 5 is a view of a compacted preform.

Thereafter, the partition member 16 may be removed by pulling the same upwardly out of the container 10. This will leave in the container a plurality of vertical extending bodies of the different colored mixtures each body conforming to the shape and size of its particular cavity. Thereafter, as indicated in FIGS. 3 and 4, a plunger 24 operated by a hollow piston rod 26 is forced down into the container 10 to compress the powdered bodies of colored mixtures into an integral solid preform 28 of various colored sections and a central opening 27 as illustrated in FIG. 5.

Figure 6:
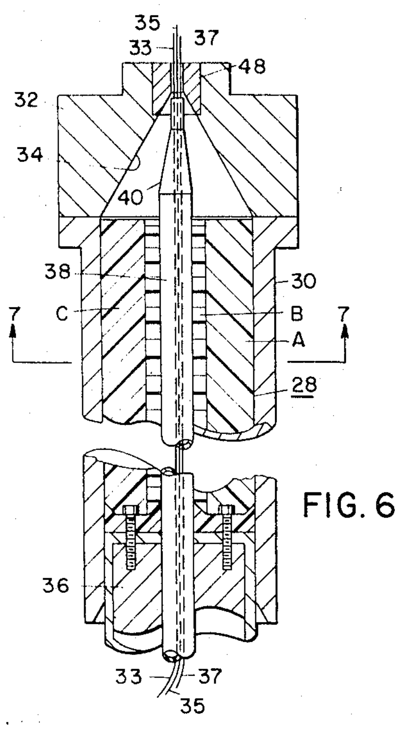
FIG. 6 is a sectional view of an extruder set-up for extruding the preform of FIG. 5 to insulate wire.

The TFE preform 28 is then placed in a well known extruder as shown in FIG. 6. The extruder comprises a cylinder 30 for receiving the preform 28 and having a suitable removable cap piece 32 formed with an internal conical cavity 34 into which one end of the preform is compressed by a plunger 36, the plunger being advanced in the cylinder by any well known worm gear and motor driven gearing (not shown). The bare wires 33, 35, and 37 to be coated pass through a hollow center rod 38 which extends throught he plunger 36 and the opening 27 in the preform 28. A wire guide tip 40 is secured to the center rod 38 and comprises three guide tubes with each receiving a respective one of the wires 33, 35, and 37 therethrough. The guides extend into a portion of the die 48 which is inserted in the cap 32. The wires proceed from the center rod into a respective guide tube through the die 48. The TFE is extruded onto the three wires as an integral uninterrupted coating as the wires emerge from the die 48. The insulated wires or cable, after it emerges from the die, is conducted in known manner first through a standard vaporizing oven (not shown) for expelling the lubricant from the insulation and then through a sintering oven (not shown) wherein the TFE insulation is sintered at normal temperatures.

Figure 7:
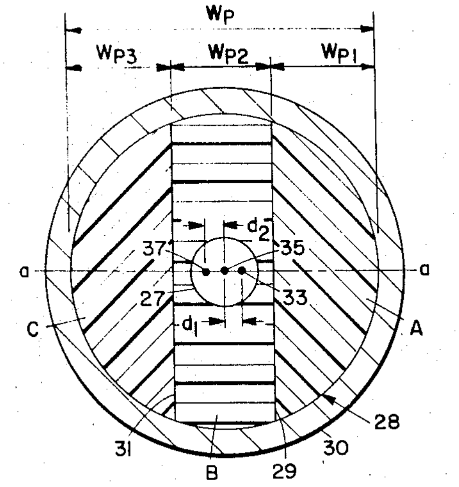
FIG. 7 is a view taken along section line 7—7 of FIG. 6.

The dimensions of the colored sections of the preform 28 and its location in the extruder is important. The dimensions of preform are designated in FIG. 7 as follows:

$W_P$=Width of the TFE preform at diameter *a—a* which passes through wires 33, 35, and 37 and is perpendicular to the chordal junctures 29 and 31 between the colored sections A and B, and B and C, respectively.

$W_{P1}$=Width of the colored section A at the diameter *a—a.*

$W_{P2}$=Width of the colored section B at the diameter *a—a.*

$W_{P3}$=Width of the colored section C at the diameter *a—a.*

Figure 8:
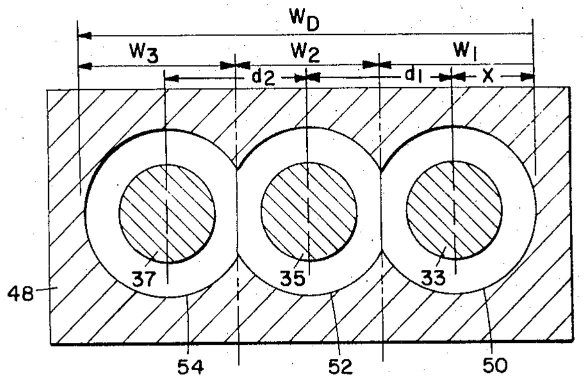
FIG. 8 is a top view of FIG. 6 illustrating a die with conductor wire extending therethrough.

The preform must bear a certain relationship with the wires and die opening also. FIG. 8 is a cross-section of the die which comprises three curved sections 50, 52, and 54 outlining the outer peripheral shape of the cable being extruded therethrough. Wires 33, 35, and 37 pass through sections 50, 52, and 54, respectively. The various dimensions of the die opening are designated as follows:

$W_D$=Width of the die opening.
$x$=Distance between the outermost edge of the die opening and the conductor 33.
$d_1$=Distance between the centers of conductors 33 and 35.
$d_2$=Distance between the centers of conductors 35 and 37.
$W_1$=Width of section 50.
$W_2$=Width of section 52.
$W_3$=Width of section 54.

The relationship of the preform to the wires and die opening is as follows:

(1) The conductors are arranged in a plane that extends perpendicular to the planes of the chordal junctures 29 and 31 and which divides the die opening in half along the width axis of the die opening.

Upon extrusion, the following relationships occur.

(a) $$\frac{W_{P1}}{W_P}=\frac{W_1}{W_D}$$

(b) $$\frac{W_{P2}}{W_P}=\frac{W_2}{W_D}$$

(c) $$\frac{W_{P3}}{W_P}=\frac{W_3}{W_D}$$

(2) Therefore, in order that each wire 33, 35, and 37 is surrounded with a respective colored insulation with the juncture of the colored sections lying between the conductors, the following relationships must be adhered to for covering conductor 33 with preform section $W_{p1}$:

(e) $$\frac{x+d_1}{W_D}>\frac{W_1}{W_D}>\frac{x}{W_D}$$

and making the proper substitution of Equation a in Equation e, the following relationship occurs for the location and width of $W_{p1}$:

(f) $$\frac{x+d_1}{W_D}>\frac{W_{p1}}{W_p}>\frac{x}{W_D}$$

and for covering conductor 35 with preform section $W_{p2}$ (g) $$\frac{x+d_1+d_2}{W_D}>\frac{W_1+W_2}{W_D}>\frac{x+d_1}{W_D}$$

and making the proper substitution of Equations a and b in Equation g, the following relationship occurs for the location and width of $W_{p2}$:

(h) $$\frac{x+d_1+d_2}{W_D}>\frac{W_{p1}+W_{p2}}{W_p}>\frac{x+d_1}{W_D}$$

Actually, the location range of a particular colored section ($n$) in a preform for covering a particular one ($n$) of a plurality of conductors can be determined by utilizing the following relationship:

(j) $$\frac{x+\epsilon d_{(n+1)}}{W_D}>\frac{W_n}{W_D}>\frac{x+\epsilon d_n}{W_D}>\frac{W_{(n-1)}}{W_D}>\frac{x+\epsilon d_{(n-1)}}{W_D}$$

wherein:

$d_n$=sum of the distances between each conductor starting with the end conductor and ending with the $n$th conductor;
$d_{(n-1)}$=sum of the distances between each conductor starting with the end conductor and ending with the conductor just prior to the $n$th conductor;
$d_{(n+1)}$=sum of the distances between each conductor starting with the end conductor and ending with the conductor after the $n$th conductor;
$W_n$=width of the die opening ending with and including that portion through which the preform is extruded to cover the $n$th conductor;

$W_{(n-1)}$=width of the die opening ending with and including that portion through which the preform is extruded to cover the conductor just prior to the $n$th conductor.

From Equations a, b and c it follows:

(k) $$\frac{W_n}{W_D}=\frac{W_{pn}}{W_p}$$

(l) $$\frac{W_{(n-1)}}{W_D}=\frac{W_{p(n-1)}}{W_p}$$

wherein:

$W_{pn}$=the width of the preform ending with and including the $n$th section;
$W_{p(n-1)}$=the width of the preform ending with but not including the $n$th section.

Making the appropriate substitutions of Equations k and l in Equation j, the following relationship occurs for determining the location range of a particular colored section ($n$) in a preform for covering a particular one ($n$) of a plurality of conductors:

(m) $$\frac{x+\epsilon d_{(n+1)}}{W_D}>\frac{W_{pn}}{W_p}>\frac{x+\epsilon d_n}{W_D}>\frac{W_{p(n-1)}}{W_p}>\frac{x+\epsilon d_{(n-1)}}{W_D}$$

In a given design the following is always known:

(1) the dimensions of the conductors;
(2) the spacing between the conductors;
(3) the thickness of insulation for each conductor;
(4) the die opening dimensions; and
(5) the diameter of the preform.

In view of this, Equation m may be readily utilized to determine the location range of a particular section in the preform.

Figure 9:
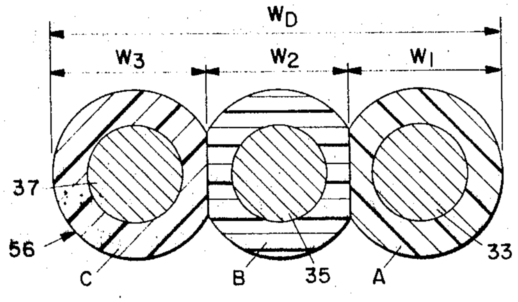
FIGS. 9–11 are views of various cables resulting from the extrusion of a preform such as that illustrated in FIG. 5.
Figure 11:
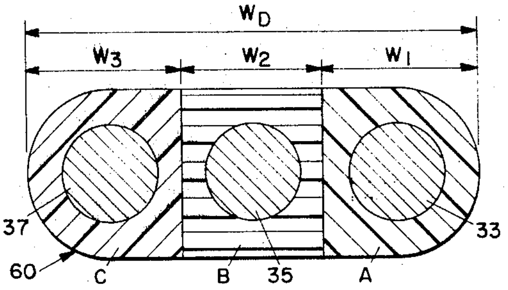
Figure 10:
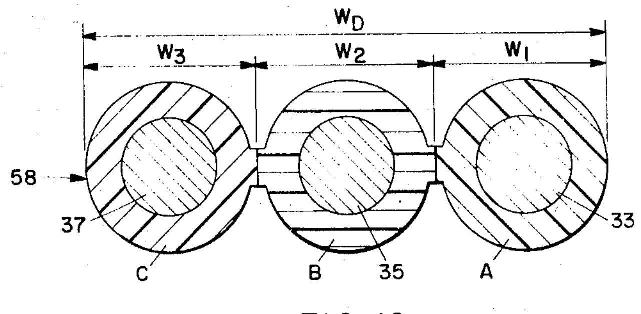

The above relationships hold true regardless of the cross-sectional shape of the die opening. For instance, FIG. 9 illustrates a ribbon cable 56 resulting from extrusion with the die shown in FIG. 8. FIGS. 10 and 11 show resulting ribbon cables 58 and 60, respectively, from the use of other shapes of die openings. Furthermore $W_1$, $W_2$, and $W_3$ need not be equal to each other. The above relationship may also apply to a two conductor cable where the insulation of one conductor is substantially thicker than the insulation covering the other conductor and the preform has a plane of juncture which is perpendicular to the plane of the two wires and passes outside of the two wires.

Figure 12:
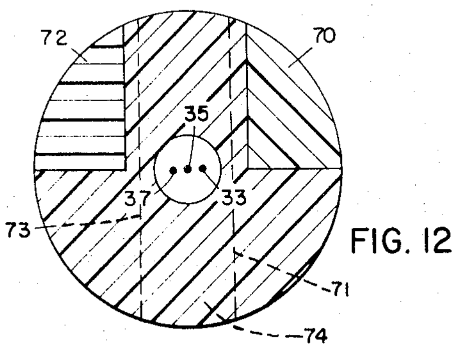
FIG. 12 is a cross-section view of a wire, preform alignment where the preform is another embodiment.

Rather than provide a cable with a plurality of varied colored sections as shown in FIGS. 9–11, the same color coding effect can be carried out by providing a partial section of coloring on the insulation surrounding each wire, with the partial section being in different colors with each partial section designating a different conductor. The preform can be in the form as shown in FIG. 12 wherein sections 70 and 72 extend the length of the preform. The section 70 must be within a section of the preform, the boundary of which is a portion of the preform periphery and an imaginary chord 71. The range of location and width of such section is determined by the same relationship as set forth in relationship (g) set forth above. The section 72 must be located within a section of the preform, the boundary of which is a portion of the preform periphery and an imaginary chord 73. The range of location and width of such section is determined by the same relationship as set forth in relationship (m) set forth above. The remaining section 74 is all one color, but if desired could have a section similar to section 70 and 72 of a different color.

Figure 13:
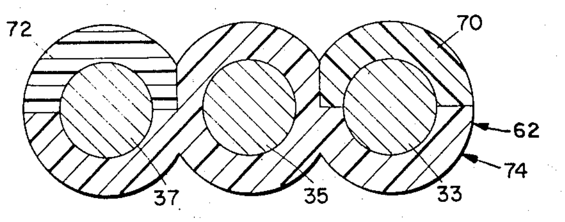
FIG. 13 is an end view of a cable resulting from the extrusion of the preform of FIG. 12.

FIG. 13 shows a cable 62 extruded in accordance with the preform of FIG. 12. If desired, either of the sections 70 or 72 may cover a smaller circumferential area of the preform in FIG. 12, whereby that section would show up as a stripe on the cable 62.

In the embodiments where the conductors lie in more than one plane, the preform must be arranged relative to the wires in such a manner that the extension of the juncture line between each colored section will pass between two of the wires thus bringing a particular one of the wires within the extended boundaries of a respective colored section. The shapes of these cables may vary with the number of conductors to be insulated. For instance, a three leaf clover shape can be utilized for a three conductor cable and four leaf clover shape can be utilized for a four conductor cable.

Figure 14:
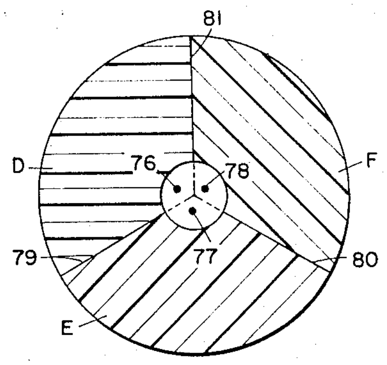
FIG. 14 is a cross-section view of a wire, preform alignment where the preform is another embodiment.
Figure 15:
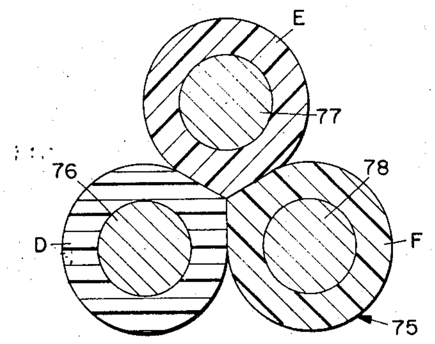
FIG. 15 is an end view of a cable made from extruding the preform of FIG. 14.

A cable in shape of a three leaf clover in cross-section is illustrated in FIG. 15 as cable 75. A preform for producing cable 15 is disclosed in FIG. 14. In this embodiment, each wire 76, 77, and 78 is located an equal distance from the center axis of the preform. Each color of insulation D, E, and F is in the form of a pie shaped section. The preform is arranged relative to the wires in such a manner that the extension of the juncture line 79 between sections D and E will pass between two of the wires 76 and 77, the extension of juncture line 80 between sections E and F will pass between wires 77 and 78, and the extension of juncture line 81 between sections F and D will pass between wires 76 and 78 thus bringing a particular one of the wires within the extended boundaries of a respective colored section.

Figure 16:
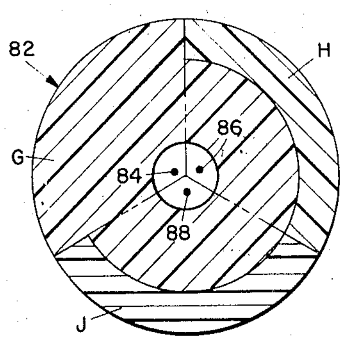
FIG. 16 is a cross-section view of a wire, preform alignment where the preform is still another embodiment.
Figure 17:
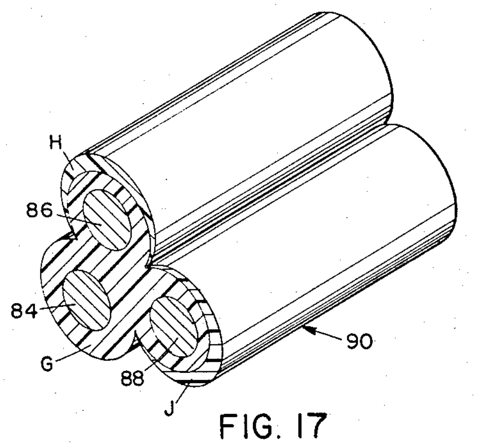
FIG. 17 is a view of a cable made from extruding the preform of FIG. 16.

Another way of color coding is shown in FIG. 16. The center portion of the preform 82 and one whole sector of the preform is one color G and the outer portion of the other sectors are of different colors H and J, respectively, which will be exposed and provide color coding for different wires 84, 86, and 88. Again these sections will have to have the same relationship to the wires as described in FIG. 15 and will produce an insulated cable 90 as shown in FIG. 17.

Figure 18:
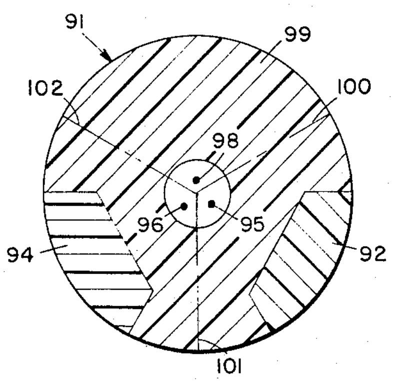
FIG. 18 is a cross-section view of a wire, preform alignment where the preform is yet another embodiment.
Figure 19:
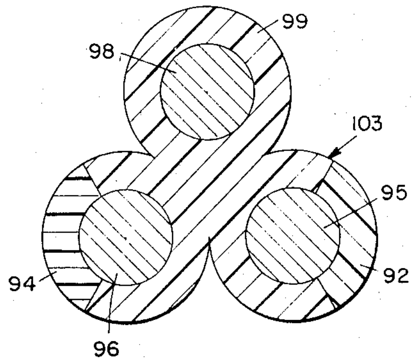
FIG. 19 is an end view of a cable made from extruding the preform of FIG. 18.

Still another method for color coding is to provide the same color of insulation for all the wires and provide different colored sections for each wire for color coding. The preform 91 for providing this is shown in FIG. 18 wherein sections 92 and 94, extending the length of the preform, are at the outer surface of the preform. The strip for each wire 95 and 96 must be located within the respective sector of the preform bounded by lines 100 and 101, and 101 and 102, respectively, as defined above for the preform illustrated in FIG. 15 when the insulation is of various colors. The remaining section bounded by lines 100 and 102 for covering wire 98 is all one color, but if desired could have a section or strip similar to sections 92 and 94 of a different color. The preform as illustrated in FIG. 18 may be extruded into a cable 103 as shown in FIG. 19, resulting in striped color coding.

Figure 20:
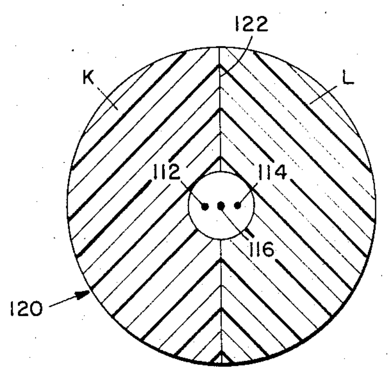
FIG. 20 is a cross-section view of a wire, preform alignment where the preform is another embodiment.
Figure 21:
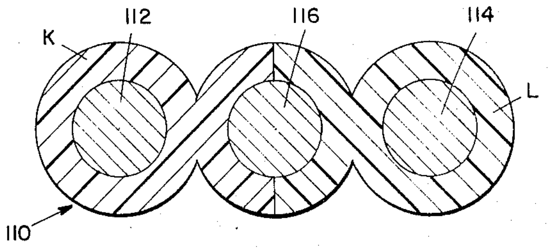
FIG. 21 is an end view of a cable made from extruding the preform of FIG. 20.

A further form of color coding is illustrated in FIG. 21 whereby only two colors are needed for a three conductor cable 110. The outer conductors 112 and 114 of the cable are covered with insulations of different colors K and L, respectively, and the middle conductor 116 is covered with an insulation of half of each color K and L. The preform arrangement for this construction is shown in FIG. 20 with the preform 120 being of the two colors K and L, each in a semi-circular section. The preform is arranged relative to the wires 112, 114, and 116 such that the juncture 122 of the two sections passes through the wire to be insulated with two colors which in this case is the middle wire 116.

This preform arrangement can apply to a cable with the three conductors in one or more planes. Obviously, this principle can apply to more than three conductors and two colors as for instance, it can apply to five conductors and three colors with the 1st, 3rd, and 5th conductor insulations being of separate colors and the 2nd conductor insulation being a combination of the color of the insulations covering the 1st and 3rd conductors and the insulation on the 4th conductor being a combination of the color of the insulations covering the 3rd and 5th conductor.

In a preform for extruding a cable having a clover leaf shape as in FIG. 14 and utilizing the same type of color coding as described for the cable of FIG. 21, the juncture of the two colors will pass through the center wire as is true for the preform, wire relationship illustrated in FIG. 20.

What we claim and desire to protect by Letters Patent is:

1. A process for extruding a multi-colored polytetrafluoroethylene insulation about at least three conductors to form a color-coded cable, said process utilizing but a single preform and a single extruder and comprising: passing at least three conductors through a center rod of an extruder and out through an exit die attached to the extruder, one of said conductors being offset from the plane of the other two conductors, inserting but a single cylindrical preform within an extruder preform barrel and surrounding the center rod therewith, said preform comprising polytetrafluoroethylene and a lubricant and having a portion of the outer surface thereof different than the color of the outer surface on each side of said portion, positioning said preform in a manner that said given colored portion is located within a section of the preform bounded by the extruder barrel and a plane passing between a pair of adjacent conductors at the preform and at the die and another plane parallel to the axis of the preform and passing between one of said pair of conductors and another adjacent conductor at the preform and at the die, and extruding the preform through said die to completely cover each conductor with a coating comprising polytetrafluoroethylene and lubricant with said given colored portion forming at least a portion of the outer surface of the insulation surrounding said last named one conductor.

2. A process as recited in claim 1 wherein said given colored portion is at the entire outer periphery surface of said section and the entire exposed surface of the insulation surrounding said one conductor is said given color.

3. A process as recited in claim 1, wherein the entire said section is said given color and the entire insulation surrounding said one conductor is said given color.

4. A process as recited in claim 1, wherein said given colored portion is a strip within said section and the insulation on said last named one conductor has a stripe thereon of said given color.

5. A process for extruding a multi-colored polytetrafluoroethylene insulation about at least three conductors to form a color-coded cable, said process utilizing but a single preform and a single extruder and comprising: passing at least three conductors through a center rod of an extruder and out through an exit die attached to the extruder, one of said conductors being offset from the plane of the other two conductors, inserting but a single preform in an extruder preform barrel and surrounding the center rod therewith, said preform comprising polytetrafluoroethylene and a lubricant and having a plurality of sections each of a different color at least at the outermost portion of the preform, positioning said preform so that an extension of the line of juncture between each colored section and the plane of the extension passes between a respective pair of said conductors at the preform and at the die, whereby a respective conductor will lie between the extension of a pair of juncture lines of a particular colored section with adjacent colored sections, the number of sections being the same as the number of conductors, and extruding the preform through said die to completely cover each conductor with a coating comprising polytetrafluoroethylene and lubricant and having a separate color at the exposed outer portion of insulation surrounding a respective conductor.

6. The process of claim 5, wherein the inner portion of the preform is of one color, the outer portion of the preform comprises sections each of a different color than each other with one of said sections being said one color, and extruding the preform with said one color of insulation surrounding each conductor and the exposed portion of the insulation surrounding each conductor each being of different colors with the exposed portion of the insulation surrounding one of said conductors being said one color.

7. The process of claim 5, wherein each colored section is generally pie shaped and each conductor is surrounded with an insulation of a respective color.

References Cited

UNITED STATES PATENTS

| | | | |
|---|---|---|---|
| 2,945,265 | 7/1960 | Sell, Jr. | 264—246 X |
| 1,477,094 | 12/1923 | Wilson | 264—171 X |
| 3,493,645 | 2/1970 | Sanderson | 264—268 X |
| 3,288,895 | 11/1966 | Windeler | 264—174 X |

ROBERT F. WHITE, Primary Examiner
W. E. HOAG, Assistant Examiner

U.S. Cl. X.R.

264—174, 323